United States Patent
Miyagawa (10) Patent No.: US 7,609,310 B2
(45) Date of Patent: Oct. 27, 2009

(54) DISPLAY DEVICE HAVING AN IMAGE PICKUP FUNCTION AND A TWO-WAY COMMUNICATION SYSTEM

(75) Inventor: Keisuke Miyagawa, Kanagawa (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 759 days.

(21) Appl. No.: 10/866,108

(22) Filed: Jun. 14, 2004

(65) Prior Publication Data
US 2004/0257473 A1 Dec. 23, 2004

(30) Foreign Application Priority Data
Jun. 17, 2003 (JP) ............... 2003-172477

(51) Int. Cl.
*H04N 5/335* (2006.01)
(52) U.S. Cl. .............. 348/302; 250/208.1; 345/102
(58) Field of Classification Search ........... 348/302; 250/208.1; 345/102
See application file for complete search history.

(56) References Cited

U.S. PATENT DOCUMENTS

| | | | |
|---|---|---|---|
| 4,400,725 A * | 8/1983 | Tanigaki | 348/14.16 |
| 4,928,301 A | 5/1990 | Smoot | |
| 5,159,445 A | 10/1992 | Gitlin et al. | |
| 5,340,978 A * | 8/1994 | Rostoker et al. | 250/208.1 |
| 5,406,323 A | 4/1995 | Tanigaki et al. | |
| 5,815,197 A | 9/1998 | Kakii | |
| 5,883,605 A | 3/1999 | Knapp | |
| 6,005,604 A | 12/1999 | Kakii | |
| 6,040,810 A | 3/2000 | Nishimura | |
| 6,137,526 A | 10/2000 | Kakii | |
| 6,163,390 A | 12/2000 | Kanda et al. | |
| 6,198,554 B1 | 3/2001 | Kanda et al. | |
| 6,243,069 B1 * | 6/2001 | Ogawa et al. | 345/102 |
| 6,278,884 B1 | 8/2001 | Kim | |
| 6,392,767 B2 | 5/2002 | Kanda et al. | |
| 6,473,631 B1 | 10/2002 | Siddoway et al. | |
| 6,542,265 B2 | 4/2003 | Kanda et al. | |

(Continued)

FOREIGN PATENT DOCUMENTS

CN 1300497 6/2001

(Continued)

OTHER PUBLICATIONS

Kwan Hee Lee et al.; '2.2 QCIF Full Color Transparent AMOLED Display'; *SID03 Digest*; pp. 104-107;2003.

(Continued)

*Primary Examiner*—Sinh Tran
*Assistant Examiner*—Anthony J Daniels
(74) *Attorney, Agent, or Firm*—Fish & Richardson P.C.

(57) ABSTRACT

A two-way communication device having a display device of novel structure and an image pickup device is provided. More particularly, a two-way communication system having a display device and an image pickup device is provided. The display device having an image pickup function includes an image pickup unit and a display panel in which light emitting elements which can transmit visible light at least and be controlled by voltage or current are arranged. A compact and lightweight device can be achieved without using a complicated optical system or an optical system having a long light path, whereby two parties can communicate while catching each other's eyes.

18 Claims, 7 Drawing Sheets

U.S. PATENT DOCUMENTS

| | | | |
|---|---|---|---|
| 6,559,433 B1 * | 5/2003 | Ozawa | 250/208.1 |
| 6,628,320 B2 | 9/2003 | Mukai et al. | |
| 6,646,672 B2 | 11/2003 | Feierbach | |
| 6,812,954 B1 | 11/2004 | Priestman et al. | |
| 7,050,074 B1 | 5/2006 | Koyama | |
| 2003/0052964 A1 | 3/2003 | Priestman et al. | |
| 2003/0193288 A1 | 10/2003 | Pavlovsky | |
| 2004/0189794 A1 | 9/2004 | Rambo et al. | |
| 2005/0245288 A1 | 11/2005 | Priestman et al. | |

FOREIGN PATENT DOCUMENTS

| | | |
|---|---|---|
| EP | 0772103 | 5/1997 |
| EP | 1 061 500 | 12/2000 |
| EP | 1 241 860 | 9/2002 |
| GB | 2 372 664 | 8/2002 |
| JP | 05-145912 | 6/1993 |
| JP | 05-161135 | 6/1993 |
| JP | 05-292493 | 11/1993 |
| JP | 06-030406 | 2/1994 |
| JP | 09-130768 | 5/1997 |
| JP | 09-168141 | 6/1997 |
| JP | 2001-231019 | 8/2001 |
| JP | 2002-014373 | 1/2002 |
| JP | 3408154 | 3/2003 |
| JP | 3408154 | 5/2003 |
| WO | 99/59312 | 11/1999 |

OTHER PUBLICATIONS

European Search Report (Application No. 04014015.4), dated Jul. 5, 2006, 3 pages.

Exhibition of Active Matrix Type Organic EL Display at "13$^{th}$ Flat Panel Display Manufacturing Technology Expo & Conference" by ELDis Group (*in Japanese with full translation*); Jul. 2, 2003.

Documents distributed in the "13$^{th}$ Flat Panel Display Manufacturing Technology Expo & Conference" by ELDis Group (5 pages).

"Two-way display developed"; *The Japan Times*; (1 page); Jul. 3, 2003.

"Mass Production of Organic EL Devices"; *Shimotsuke Newspaper* (*in Japanese with full translation*); Jul. 3, 2003.

*Yomiuri Newspaper* (*in Japanese with full translation*), 2 pages, Jul. 4, 2003.

Office action (Application No. 200410049573.X; CN7201) dated Aug. 31, 2007 (English).

"The Subject Person Can Also See the Picture in Shooting"; *Yomiuri Newspaper* (*in Japanese with full translation*), 2 pages, Jul. 4, 2003.

* cited by examiner

DISPLAY DEVICE HAVING AN IMAGE PICKUP FUNCTION AND A TWO-WAY COMMUNICATION SYSTEM

BACKGROUND OF THE INVENTION

1. Field of the Invention

The present invention relates to a display device having an image pickup function which can display an image and take an image of an object at the same time. More particularly, the invention relates to a display device having an image pickup function which can take an image of a user as an object and display an image at the same time. In addition, the invention relates to a two-way communication system which can take an image of a user as an object while displaying an image of the others.

2. Description of the Related Art

In recent years, with the advance of telecommunication networks, what is called a two-way communication system such as a videophone system and a video conference has been developed, in which two parties can communicate while viewing an image of each other.

According to the two-way communication system, it is possible to take an image of a user (object) and to display an image of the other party at the same time.

For example, an image pickup and displaying device (shooting device) having a special screen which turns to be transparent or opaque according to an incident angle of light, and an image pickup device and a projector display device each disposed on the back of the screen is disclosed (see Patent Document 1 for example). According to such an image pickup and displaying device, two parties can catch each other's eyes when their images are projected by the projector display device which is disposed in the opaque direction of the screen.

However, according to the Patent Document 1, it requires a special screen as well as an image pickup device and a projector display device, leading to a large and heavyweight device. Therefore, such a device cannot be applied to a portable electronic device.

Meanwhile, a two-way communication system in which two parties can communicate while catching each other's eyes is also disclosed (see Patent Document 2 for example). The two-way communication system includes a display panel having a monitor screen for displaying an image of the other party, a position specifier for specifying the position of a user with respect to the monitor screen, an image pickup unit for imaging of the user, and a support mechanism for setting the image pickup unit between the user and the monitor screen. In particular, the image pickup unit is disposed within the area which corresponds to the position specified by the position specifier and is determined by the parallactic angle in which eyes of two parties can be judged to meet each other, which means the image pickup unit is disposed in the specified position which obstructs a part of the monitor image of the other party.

However, the two-way communication system according to the Patent Document 2 has a problem in that a camera as an image pickup portion is disposed in a projected manner over an entire monitor screen (display screen), which interrupts user's view since the camera partially obstructs the monitor image and thus shades a part of the image.

In addition, a display device having an image pickup function which can display an image and take an image of an object at the same time while securing an eye focus of the user who is viewing the displayed image is disclosed as well (see Patent Document 3 for example). The display device includes a display panel having a display screen, a pinhole portion formed on the display screen, and an image pickup unit which uses the pinhole portion as a light path. According to the structure, it is possible to display an image on the display panel while imaging an image of a user as an object.

However, according to the display device having the image pickup function of the Patent Document 3, a part of a display screen is broken by forming a pinhole thereon even when it has a small diameter, thus obstructs a display with high definition and high quality. In addition, since there is a limitation on the downsizing of the pinhole diameter, the defect in a pixel due to the pinhole becomes relatively large when the display screen is small such as a portable phone. Therefore, it is impossible to completely remove the sense of discomfort of the user

[Patent Document 1]
Japanese Patent Laid-Open No. Hei 6-30406 (Page 2, FIG. 2)
[Patent Document 2]
Japanese Patent Laid-Open No. Hei 9-130768 (Page 10-11, FIG. 1)
[Patent Document 3]
Japanese Patent Laid-Open No. 2001-231019 (Page 7 to 8, FIG. 5)

SUMMARY OF THE INVENTION

In view of the foregoing problems, the invention provides a compact and lightweight display device having an image pickup function and a two-way communication system which can take an image of a user as an object and display an image at the same time without degrading an image quality by disposing a camera which obstructs an image on the display screen or forming a pinhole which will cause a defect in a part of the image, and the like.

Also, the invention provides a compact and lightweight display device having an image pickup function and a two-way communication system which can display an image and take an image of a user as an object while securing an eye focus of the user who is viewing the displayed image.

The invention provides a display device having an image pickup function including an image pickup unit and a display panel which can transmit visible light at least and in which light emitting pixels are arranged which can be controlled by voltage or current.

The display panel can display a variety of images such as still images or moving images by controlling the emission of each pixel so that the user can view the images. The pixel can be formed by using an element whose emission such as luminance and lighting period can be controlled by voltage or current. More preferably, it can be formed by using a light-emitting element which includes a pair of light-transmissive electrodes and a light-emitting material sandwiched between them. The light-emitting material is preferably a material which generates electroluminescence which allows other relevant materials to be sandwiched between the pair of the electrodes additionally.

As a display panel which is applied to the invention, the one in which light-emitting elements each including a pair of electrodes and a light-emitting material sandwiched between them are arranged in matrix on a light-transmissive flat substrate which transmits visible light at least can be used. By forming the display panel on the flat substrate, the thinner size and lighter weight of the device can be achieved.

The light emitted from the pixels includes light within the visible light spectrum. The display panel may be formed either by arranging pixels of the same emission color, or by arranging pixels of the specified emission color in the specified area, what is called an area color display panel. Further, it may be formed by arranging pixels of a plurality of emission colors so as to perform a multi-color display as well. Alternatively, it may be formed by arranging pixels of white emission. It is also possible to form the display panel so that a user can recognize the emission of the pixels through a colored layer (color filter).

It is preferable that a laminate of the pair of the electrodes and the light-emitting material sandwiched between them as the components constituting the light-emitting element are formed by using light-transmissive materials or formed to have an enough thickness to maintain transmittancy. For example, as a material to form the pair of the electrodes, a light-transmissive conductive film material including indium oxide, zinc oxide, or tin oxide (ITO, ITSO, IZO, or ZnO), aluminium including alkaline metal or alkaline earth metal, silver, other metal materials, or an organic compound including alkaline metal or alkaline earth metal is used. The pair of the electrodes are preferably formed to be thin enough to transmit visible light (100 nm or less, or more preferably, 20 to 50 nm in the case of using a metal material) by using the above material.

According to the invention, by forming one of the pair of electrodes constituting the light-emitting element by using a transparent conductive film material and the other electrode by using the aforementioned metal material so as to control the film thickness of each electrode, the ratio of light emitted from each electrode to outside can be controlled to be different. That is, the electrode formed by using the transparent conductive film material can emit light at a higher luminance than the other electrode formed by using the metal material.

According to the invention, a self-luminous display panel which can transmit visible light is provided by forming the above light-emitting elements having transmittancy on a substrate having transmittancy.

An image pickup unit according to the invention is disposed on the back of the display panel which cannnot be seen by a user directly. The image pickup unit can take an image of an object through the display panel. That is, the image pickup unit is disposed so as to take an image of an object by receiving the light that has passed through the display panel or through the display panel and the substrate mounting the display panel.

As an image pickup unit, a camera including a light-receiving portion formed by using an optical sensor of a CCD (Charge Coupled Device) type or a CMOS (Complementary MOS) type can be used. Although the image pickup unit is disposed on the back of the display panel, the optical sensor of the light-receiving portion is not necessarily required to face a user as an object. Alternatively, the image pickup unit may have a structure in which outside light enters the optical sensor through an optical system such as a lens or a mirror.

According to the invention, by forming a light-transmissive display panel using light-emitting elements, light emitted from the light-emitting elements may be emitted to the side in which the image pickup unit is disposed as well as the side which is seen by a user. In that case, it is preferable that the image pickup unit is provided with a correction unit in which a deviation in color and luminance of an image is corrected corresponding to the transmittance of the display panel and a correction unit in which the glare caused by light reflecting on the display panel is eliminated from an image.

When using the display panel in which the ratio of light emitted from each electrode of the light-emitting element to outside is controlled to be different in the case of forming one of the pair of electrodes constituting the light emitting element by using a transparent conductive film material and the other electrode by using the aforementioned metal material and controlling the film thickness of each electrode, it is preferable that the image pickup unit is disposed on the side of the electrode formed by using the metal material.

According to the aforementioned structure, it is possible to take an image of a user as an object and to display an image to be viewed by the user on a display screen at the same time while he is facing the display screen. That is, an image display and an image pickup can be performed at the same time while securing an eye focus of the user who is viewing the displayed image. In particular, when two parties use the similar two-way communication devices, they can communicate while catching each other's eyes.

According to the invention, an image pickup unit is disposed on the back of the display panel so as to be within the scope of the optical visual axis of the user. The user can view an image displayed on the display screen while being shot an image of himself with his eyes focused on the image pickup device. Here, the term 'the optical visual axis' includes the vector line in the same direction as the visual axis, and 'focus one's eyes on the image pickup device' includes the case in which one's eyes meet the other party's after the light on the visual axis is optically converted through reflection, refraction, and the like. For example, it includes the case in which a user's eyes meet the other party's by reflecting light on a reflector.

The two-way communication system of the invention includes the aforementioned display device of the invention which can take an image, and it can display an image of the other party while imaging of a user as an object.

According to the two-way communication system of the invention, two parties can communicate with each other through wire transmission or radio transmission while viewing an image of each other on the display screen. In addition, the two-way communication system includes the aforementioned display device of the invention which can take an image, and at least one party is required to have the display device having an image pickup function which can take an image of him as an object while displaying an image of the other party on the display panel. In addition, the display screen can display images, text, figures, and graphic symbols of the other party side.

DETAILED DESCRIPTION OF THE INVENTION

Embodiment Mode

Hereinafter described are embodiment modes of the invention with reference to the accompanying drawings. It should be noted that like components are denoted by like numerals as of the first embodiment mode and will be explained in no more details.

Embodiment Mode 1

Described in this embodiment mode is a videophone system as an example of a display device having an image pickup function.

Figure 1A:
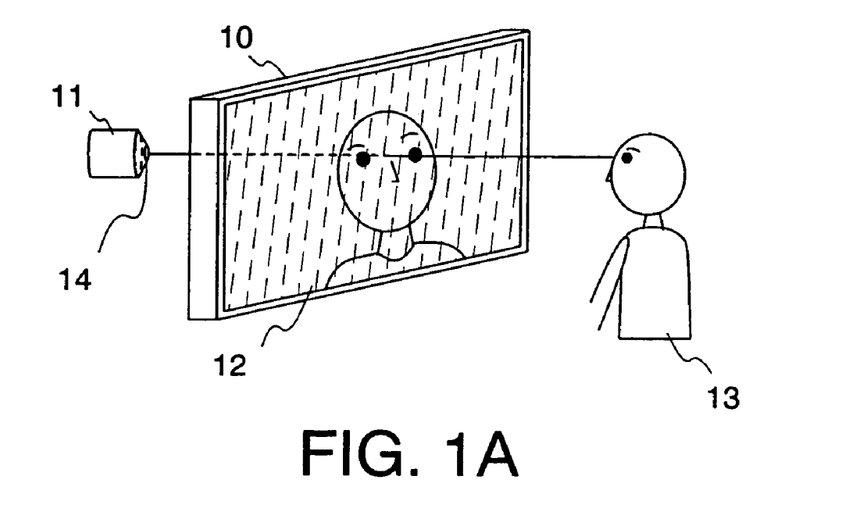
FIGS. 1A and 1B each illustrate a videophone system of the invention.

FIG. 1A shows a perspective view of a videophone system which includes a display panel (dual emission panel) 10, and an image pickup unit 11 disposed on the back of the display panel 10. A first display screen 12 of the display panel 10 displays an image of the other party. Although either the first display screen 12 or a second display screen, which locates opposite side of the first display screen, can display an image, the first display screen 12 is to display an image in this embodiment mode. When the second display screen is to display an image, a circuit for inverting the image is preferably provided.

A user 13 faces the first display screen 12, and views an image of the other party displayed on it so as to catch his eyes. The image pickup unit 11 includes an image pickup lens 14 which is disposed to be on the visual axis of the user 13. The image pickup unit 11 at this time is required to be disposed within the distance capable of imaging of the user 13, and to focus on the user 13.

Figure 1B:
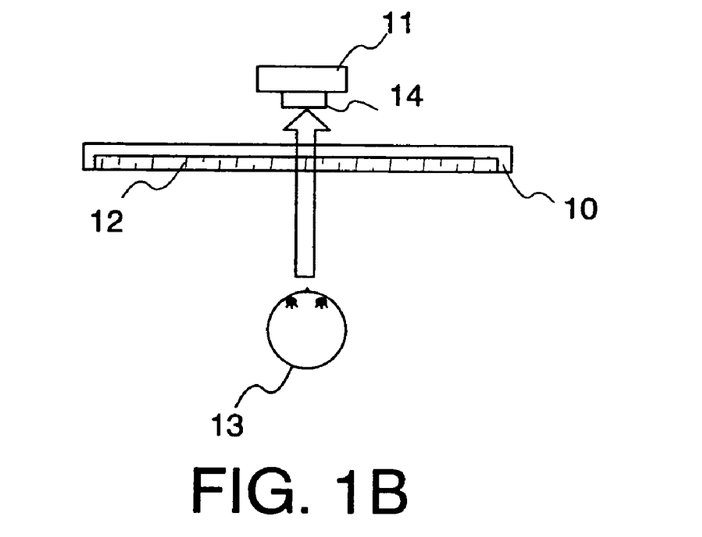

FIG. 1B shows a top plan view of a videophone system which includes the display panel 10, the image pickup unit 11, and the first display screen 12. When the user 13 faces the first display screen 12, the other party can focus his eyes on an image shot by the image pickup unit 11.

By using such a videophone system, a user can communicate with the other party while catching each other's eyes. In addition, since the image pickup unit is not located in front of the display panel, the user can communicate with the other party with his eyes met with the other's in the natural manner. In particular, even when the display panel of the videophone system is enlarged, the image pickup unit is not required to be disposed in front of the display screen, therefore, it can be disposed in the area which allows eyes of two parties to meet each other.

According to the display device having an image pickup function of this embodiment mode, when using a light-transmissive display panel formed by arranging light emitting pixels, or a display panel in which light-emitting elements which can transmit outside light, each including a pair of electrodes and a light-emitting material sandwiched between them, are formed on a substrate in which light is emitted from at least one of the electrode, thinner size and lighter weight of the device can be achieved as compared to the conventional devices. Specifically, a display panel in which light-emitting elements including a pair of electrodes and a light-emitting material sandwiched between them are arranged in matrix on a flat substrate which at least transmits visible light can be used.

In this manner, in the case of fabricating a videophone system in which a display panel and an image pickup unit are separately disposed, the place of the image pickup unit can be designed in accordance with the usage of the user by using reflectors.

Although this embodiment mode shows a videophone system in which a display panel and an image pickup unit are separately disposed, they may be integrated as well.

In addition, by setting such a videophone system in each of the user side and the other party side, thereby connecting them by a wire or a radio communication line, a two-way communication system can be constructed.

It should be noted in this embodiment mode that the image pickup lens of the image pickup unit is not necessarily disposed on the visual axis of the user, and it may be disposed so that the user's eyes meet the other party's after the light on the visual axis is optically converted through reflection, refraction, and the like. For example, by disposing a reflector such as a mirror between the display panel and the image pickup unit, the user and the other party can communicate while catching each other's eyes.

Embodiment Mode 2

Described in this embodiment mode is a portable phone as an example of a display device having an image pickup function.

Figure 2A:
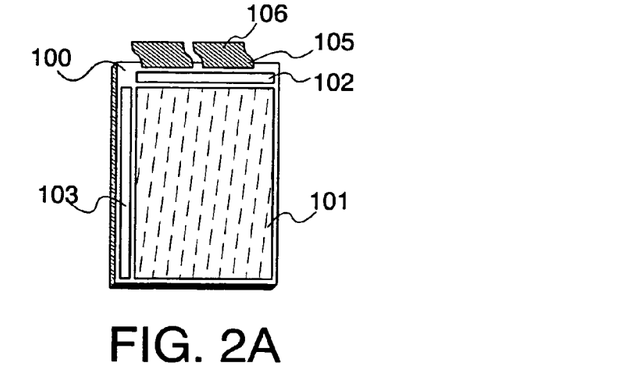
FIGS. 2A to 2C each illustrate a portable phone of the invention.
Figure 2B:
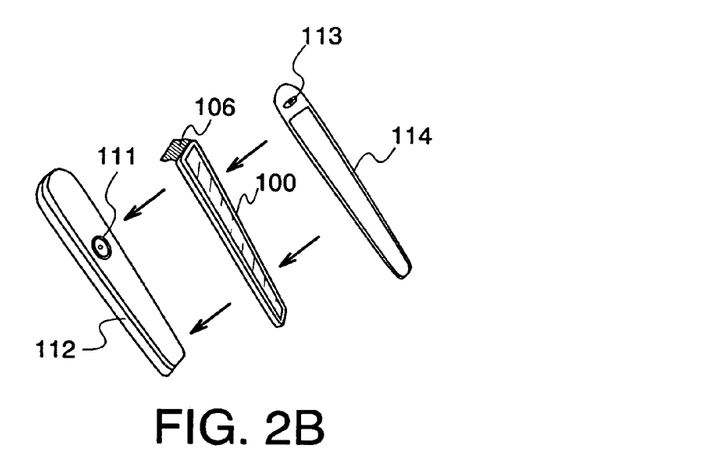
Figure 2C:
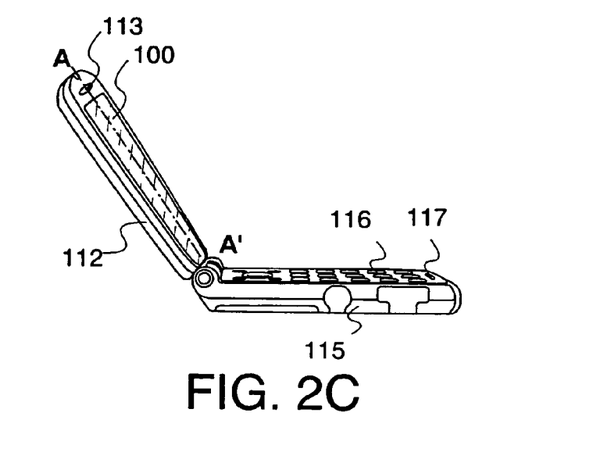

FIG. 2A shows an enlarged view of a display panel, FIG. 2B shows a perspective view of a portable phone, and FIG. 2C shows an overall view of a portable phone.

A display panel 100 shown in FIG. 2A integrates a pixel portion 101, a signal driver circuit portion 102 and a scan driver circuit portion 103 as driver circuit portions. The signal driver circuit portion 102 and the scan driver circuit portion 103 are connected to external circuits through a connection terminal 105, an ACF (Anisotropic Conductive Film), or an FPC (Flexible Printed Circuit) board 106 for example, through which signals are input. The external circuits include a power source circuit, a controller, and the like.

The display panel 100 may be either an active matrix type or a passive matrix type. In the case of the passive matrix display panel, it is easier to increase an aperture ratio as compared to the active matrix display panel, which provides the higher transmittancy.

Since a light-emitting element in the display panel includes a pair of electrodes: a first electrode and a second electrode (correspond to a cathode and an anode of a light-emitting element respectively) having transmittancy, the reflection of outside light is reduced. Therefore, the display panel can be dispensed with a circular polarizing plate for preventing outside light from scattering. However, depending on the structure of a display panel, it is necessary to prevent the reflection of external light. In that case, a circular polarizing plate may be disposed.

By disposing the panel inside the housing of the portable phone as shown in this embodiment mode, the backside of the display panel can have a black color or its close color, therefore, a clear black display with high contrast can be performed even in the case of performing a black display (in the case of inputting an OFF signal).

In addition, it is also possible to dispose a polarizing plate on the display panel as needed. For example, in the case of using a pair of polarizing plates for linearly polarizing light, it is impossible to see the goods (other users, for example) behind the display panel when they are disposed in a state of crossed nicols. However, if they are disposed with their optical axes moved in some measure so as to come off the state of crossed nicols, the goods behind the display panel can be seen. More preferably, a unit for changing an angle of the pair of polarizing plates may be disposed, thereby adjusting the polarizing plates according to need. Alternatively, it is also possible to dispose a polarizing plate or a circular polarizing plate on either or both sides of a dual emission panel.

Furthermore, it is also possible to dispose an anti-glare treatment for reducing the glare (caused by light reflecting on the panel) by forming minute concavity and convexity on the surface of the panel to diffuse the reflected light or an antireflective coating by heat treatment. In addition, a hard-coat treatment may be also applied against external shocks and scratches.

FIG. 2B shows a back of the display panel 100 as shown in FIG. 2A, in which an image pickup unit 111 is disposed so as to be on the visual axis of the user.

The image pickup unit 111 is disposed in the predetermined position of a first housing 112. As the image pickup unit 111, a camera including a light-receiving portion formed by using an optical sensor of a CCD (Charge Coupled Device) type or a CMOS (Complementary MOS) type can be used. On the wiring board (a board for forming a printed circuit board and the like) which is disposed in the first housing 112 or a third housing 115, an integrated circuit component for controlling the image pickup unit and chip components (resistor, capacitor, coil, and the like) are mounted. Further, the wiring board is mounted with an image processing circuit and the like. A circuit for driving the display panel is disposed externally as well. The image processing circuit includes a circuit for correcting deviations in color and luminance of an image, in which a deviation component of transmittance is eliminated from the image. Specifically, the correction can be performed with reference to the method described in Embodiment Mode 7.

Although the signal driver circuit and the scan driver circuit can be integrally formed on the substrate shown in FIG. 2A, it is also possible to connect an IC chip with the signal driver circuit and the scan driver circuit on the wiring board externally.

The display panel 100 is sandwiched between the first housing 112 and a second housing 114, thereby fixing it in the housings. An audio output portion 113 is formed on the second housing 114.

As shown in FIG. 2C, the third housing 115 includes an operating key 116, an audio input portion 117, and the like. The third housing 115 is connected to the first and second housings 112 and 114 on the display panel side with a hinge.

According to the portable phone of this embodiment mode, the image pickup device 111 is disposed on the back of the display panel 100 so that an image pickup lens is on the optical visual axis of the user (each of the user and the other party) while he is facing the display panel. As a result, they can communicate while catching each other's eyes. It is needless to mention that an optical system can be constituted as the image pickup unit, in which optical components such as a lens and a mirror are combined appropriately.

Embodiment Mode 3

Described in this embodiment mode is an example of a portable phone mounting a dual emission display panel and an image pickup unit.

Figures 3A, 3B:
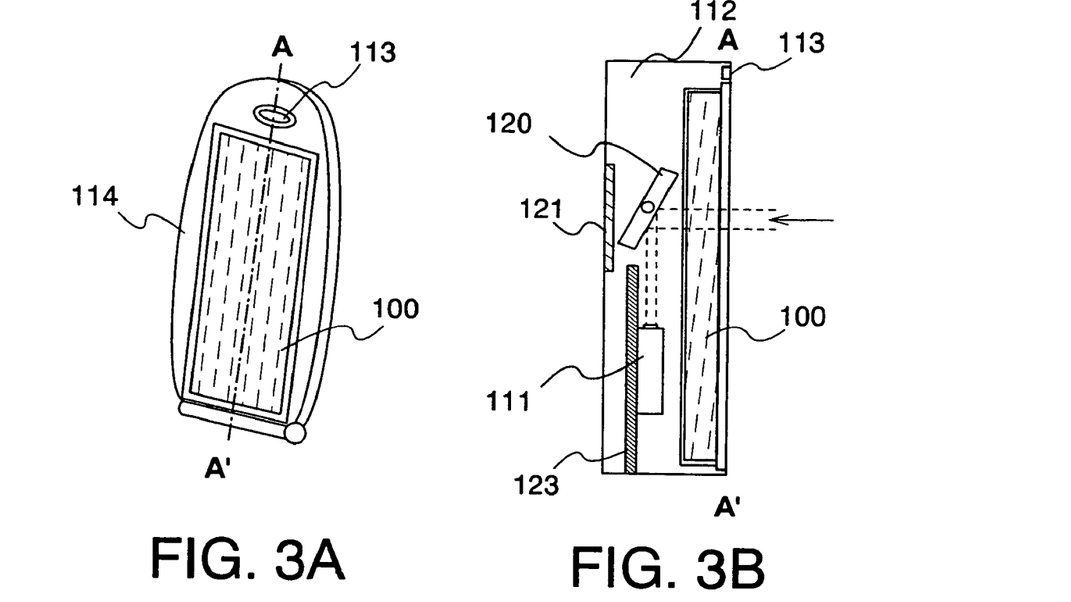
FIGS. 3A to 3D each illustrate a portable phone of the invention.
Figures 3C, 3D:
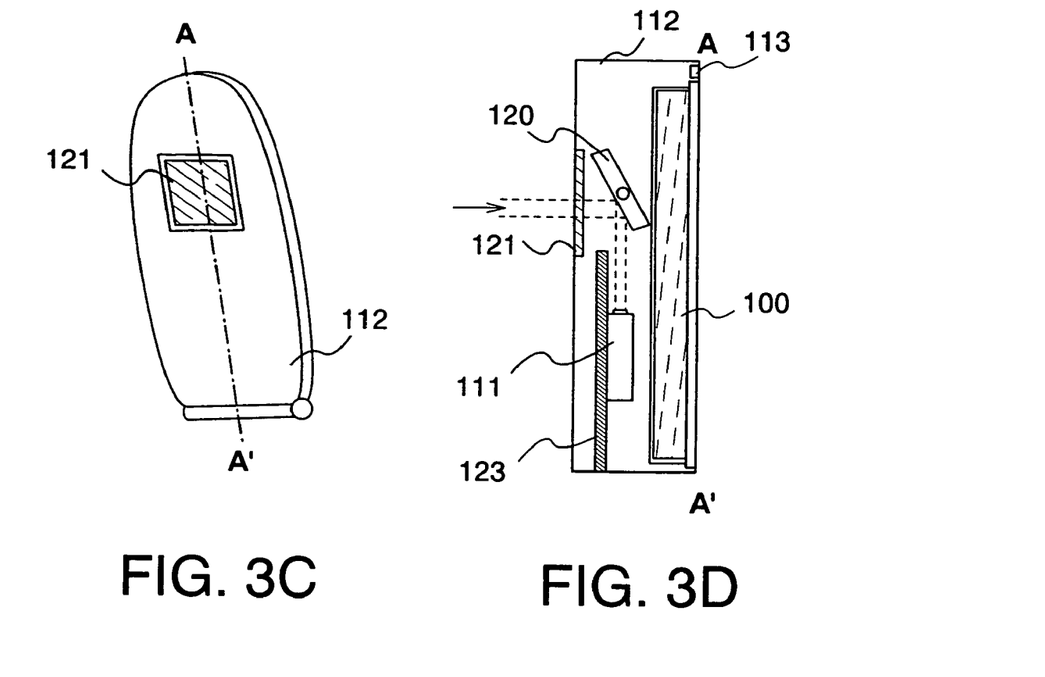

FIG. 3A shows a view of a second housing of a portable phone according to the present embodiment mode, and FIG. 3B shows a cross-sectional view taken along a line A-A'. FIG. 3C shows a view of a first housing of a portable phone according to the present embodiment mode, and FIG. 3D shows a cross-sectional view taken along a line A-A'.

FIGS. 3A and 3B show an example of the dual emission display panel 100 including the second housing 114 with a display panel 100 having light-transmissive pixels, a mirror 120, a wiring boad (circuit board) 123 mounting an IC and the like. That is, image pickup means 111 is disposed on the wiring board, and a lens in the image pickup means 111 faces the mirror 120. Thus, the mirror 120 reflects an image of a user and the like through the dual emission display panel 100. That means, the mirror 120 is required to reflect both of the imaging range of the image pickup means 111 and the range of the user and the like through the dual emission display panel 100. Therefore, the mirror 120 is disposed in the intersection between the extended line of the lens of the image pickup means 111 and the extended line of the user and the like, for example the extended line of his visual axis so as to be 30 to 80 degrees slanted with respect to the extended line of the lens. At this time, an image of the user may be reflected on the mirror 120 with the light condensed by the lens and the like. As a result, the mirror 120 can be disposed closer to the dual emission display panel 100, which achieves the downsizing of the portable phone.

The mirror 120 is preferably rotatable. That is, the mirror 120 is controlled by a switching circuit disposed on the wiring board 123, and a light path of the image pickup unit 111 is switched in an electric or an electromagnetic manner. It may also be switched by the user using a switch disposed on the surface of the housing.

The mirror 120 is preferably rotated at an angle which can receive light transmitted through the dual emission display panel 100 at least, and light to the image pickup unit. For example, the angle may be set at 45 degrees with respect to the dual emission display panel 100, and 45 degrees with respect to the extended line of the image pickup unit 111. By using the mirror 120 disposed in this manner, light emitted from the dual emission panel 100 can be reflected and an image can thus be took by the image pickup unit 111. By using the cellar phone, which is disposed with light-transmissive panel 100, a mirror 120 and a image pickup means 111, two parties can communicate while viewing an image of each other.

FIGS. 3C and 3D show an example of the dual emission display panel in which the mirror 120 faces a different side from that shown in FIG. 3B by a switch. In this mode, not a two-way communication in which images of two sides are displayed, but an image pickup is performed, therefore, it is referred to as a digital camera mode. In digital camera mode, an image on an image pickup screen 121 can be shot. At this time, the mirror 120 is at an angle, for example, 45 degrees with respect to the image pickup screen 121, namely 45 degrees with respect to the extended line of the lens.

It should be noted that the dual emission display panel 100 may be used as an image pickup screen as well according to the invention.

By providing a mechanism for switching a light path of image pickup, it can also be used as a camera which is capable of imaging a still image or a moving image of both of the first housing 112 side and the second housing 114 side.

Embodiment Mode 4

Described in this embodiment mode is a portable phone mounting a dual emission display panel and having a different function from that of Embodiment Mode 3.

Figure 4A:
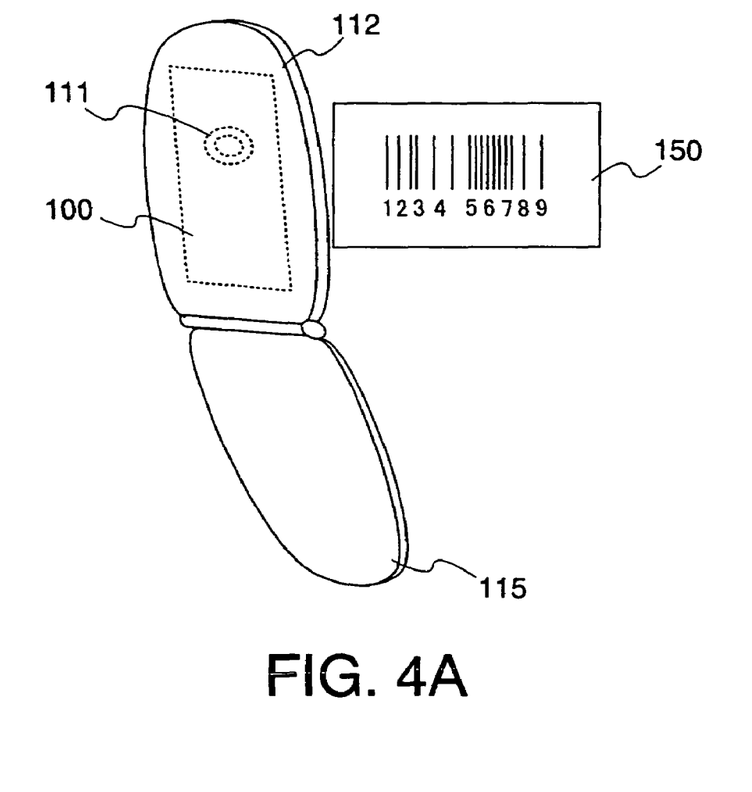
FIGS. 4A and 4B each illustrate a portable phone of the invention.

FIG. 4A shows a portable phone mounting a reading unit (barcode reader) as a unit for reading data such as barcode. FIG. 4A shows a back of a portable phone. The first housing 112 includes the dual emission display panel 100, the image pickup unit 111 disposed on the back of the dual emission display panel 100, and the third housing 115 connected to the first housing 112 with a hinge. The portable phone also includes a reading unit for inputting data to be read, for example data of a barcode 150. In this case, when the barcode 150 is exposed to the display screen of the dual emission display panel 100, it can be read by the image pickup unit 111. Since the dual emission display panel 100 has transmittancy, data can be input by using the image pickup unit.

Figure 4B:
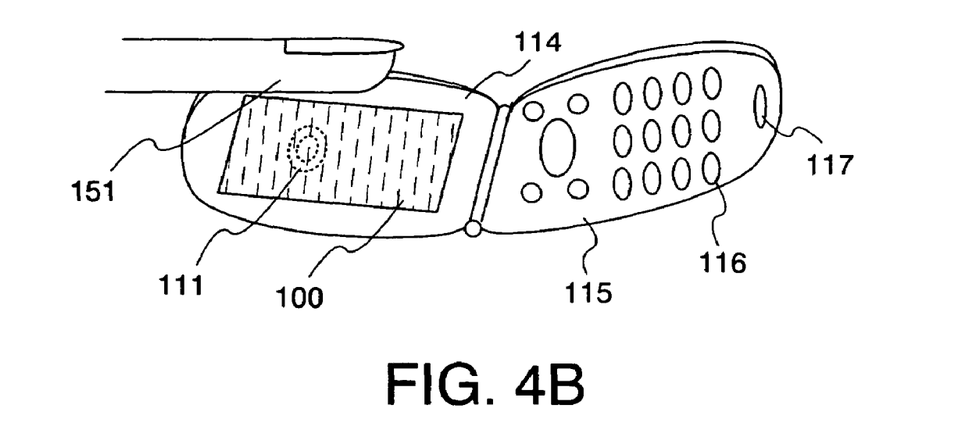

The data to be read is not limited to a barcode, and it may be any signs which can be read optically such as text, symbols, figures, secret codes, and patterns. In addition, biological data 151 such as a finger print or palm print may also be read as shown in FIG. 4B. A portable phone shown in FIG. 4B includes the second housing 114 including the dual emission display panel 100, the image pickup unit 111 disposed on the back of the dual emission display panel 111, and the third housing 115 connected to the first housing 112 with a hinge. The third housing 115 includes the operating key 116, the audio input portion 117, and the like. The biological data 151 such as a finger print or palm print can be read by holding it close to the display screen of the dual emission display panel 100. In this case, it is read by the image pickup unit 111 even in dark using a part of or whole of the dual emission display panel 100 as a light source.

In this manner, by providing a function for reading data in the portable phone, higher security can be achieved, which prevents unauthorized use of the portable phone. In addition, more accurate identification is achieved as compared to an identification system using a password and the like. Thus, the security and reliability can be enhanced in the case of using the portable phone of this embodiment mode as a cash system.

Embodiment Mode 5

Described in this embodiment mode is a structure of a dual emission display panel which can be applied to each of Embodiment Modes 1 to 4.

Figure 5:
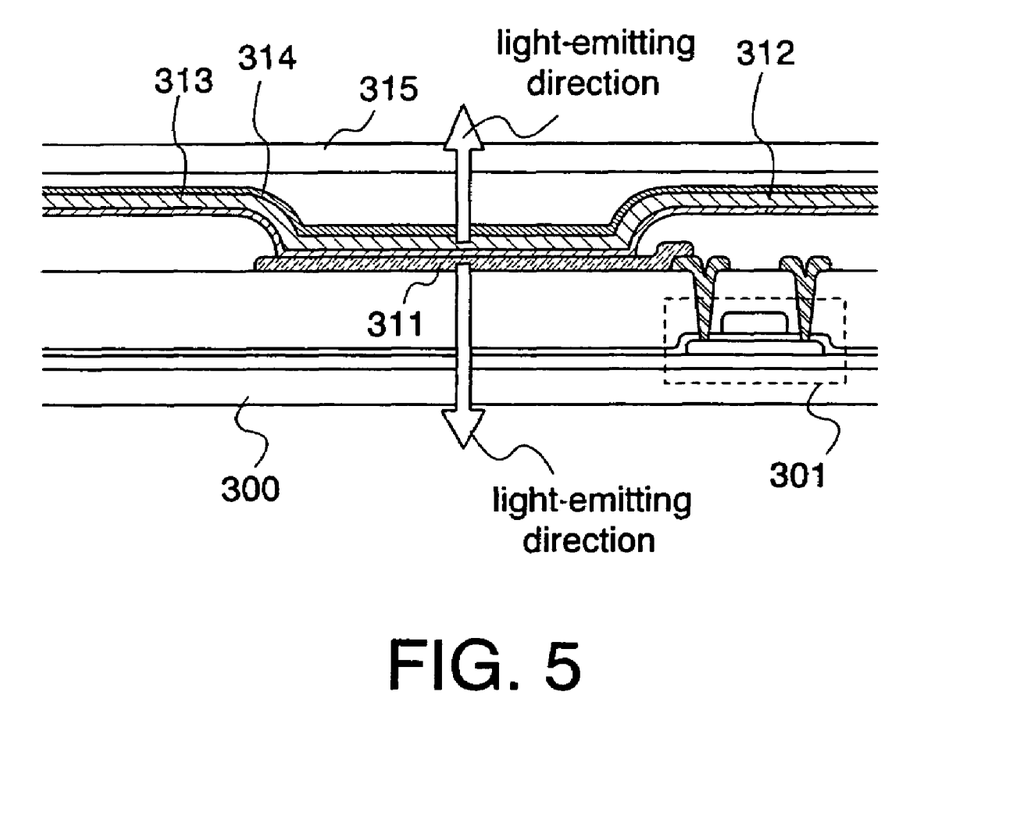
FIG. 5 illustrates a cross-sectional structure of a dual emission panel of the invention.

FIG. 5 shows a cross-sectional view of a pixel portion of a dual emission display panel. According to the present embodiment mode, a thin film transistor (TFT) having a polycrystalline film formed on an insulating substrate is used as a driving transistor, however, it may be a thin film transistor having an amorphous silicon film, or a MOS transistor having a single crystalline silicone as well. In addition, although a P-channel transistor is used as a driving transistor in this embodiment, it is needless to say that an N-channel transistor can be employed as well.

As shown in FIG. 5, a driving TFT 301 formed on a substrate 300 having an insulating surface includes impurity regions of a source region and a drain region each of them is doped with an impurity element such as boron to its semiconductor film. As for the semiconductor film, a film which is applied laser irradiation crystallization, crystallization by heating, or crystallization by using catalysis of a metal element such as nickel or titanium is used. On the semiconductor film, a gate electrode and a gate line (scan line) are formed through a gate insulating film, and the part of the semiconductor film right under the gate electrode functions as a channel forming region. Then, a first insulating film is formed so as to cover the gate electrode, and a contact hole is formed in the impurity region thereon. A wiring formed in the contact hole functions as a source wiring (signal line) and a drain wiring. The signal line is input a video signal, and in accordance with the signal, light is emitted from a light-emitting element. A first electrode 311 is formed so as to be electrically connected to the drain electrode. Then, a second insulating film is formed so as to cover the first electrode 311, and a hole is formed to penetrate each of the first electrode 311 by the second insulating film. In the hole, a layer 312 including an electro luminescent layer (hereinafter referred to as an electro luminescent layer (EL layer)) is formed. Then, a second electrode 313 is formed so as to cover the EL layer 312 and the second insulating film. Thus, a light emitting pixel which can be controlled by applying voltage or current to the first and second electrodes can be formed.

In the EL layer 312, an HIL (hole injection layer), an HTL (hole transporting layer), an EML (light-emitting layer), an ETL (electron transporting layer), and an EIL (an electron injection layer) are sequentially laminated in this order from the anode side. Typically, CuPc is used for the HIL, á-NPD is used for the HTL, BCP is used for the ETL, and BCP:Li is used for the EIL.

In addition, in the case of performing a full color display, materials each emitting red (R), green (G), and blue (B) may be selectively deposited by vapor deposition as the EL layer 312 by using a deposition mask or ink-jet printing. Specifically, CuPc or PEDOT is used for the HIL, á-NPD is used for the HTL, BCP or $Alq_3$ is used for the ETL, and BCP:Li or $CaF_2$ is used for the EIL. As for the EML, $Alq_3$ in which dopant corresponding to each color of RGB (DCM and the like for R, and DMQD and the like for G) may be used for example. It should be noted that the invention is not limited to the laminate structure of the aforementioned EL layer.

The specific laminate structure of the EL layer 312 is as follows=in the case of forming the EL layer 312 for red emission for example, CuPc of 30 nm in thickness and á-NPD of 60 nm in thickness are sequentially deposited as an HIL and an HTL. Then, by using the same mask, $Alq_3$ of 40 nm in thickness which is doped with $DCM_2$ and rubrene as a red EML, BCP of 40 nm in thickness as an ETL, and BCP of 1 nm in thickness which is doped with Li as an EIL are sequentially deposited. In the case of forming the organic compound layer 312 for green emission for example, CuPc of 30 nm in thickness and á-NPD of 60 nm in thickness are sequentially deposited as an HIL and an HTL. Then, by using the same mask, $Alq_3$ of 40 nm in thickness which is doped with coumarin 545T as a green EML, BCP of 40 nm in thickness as an ETL, and BCP of 1 nm in thickness which is doped with Li as an EIL are sequentially deposited. In the case of forming the organic compound layer 312 for blue emission for example, CuPc of 30 nm in thickness and á-NPD of 60 nm in thickness are sequentially deposited as an HIL and an HTL. Then, by using the same mask, bis[2-(2-hydroxyphenyl)-benzoxazolato]zinc:Zn$(PBO)_2$ of 10 nm in thickness as a blue EML, BCP of 40 nm in thickness as an ETL, and BCP of 1 nm in thickness which is doped with Li as an EIL are sequentially deposited.

As described above, CuPc and á-NPD can be used in common to form the EL layer 312 for each color for the whole pixel portion. In addition, the same mask can be used for each color EML for each color in such a manner that a mask is moved after forming the red EML to form the green EML, and then, it is moved again to form the blue EML. The laminate order of the EML for each color may be determined appropriately.

In addition, in the case of white light emission, a full color display may be performed by additionally providing color filters, or color filters and color conversion layers. The color filters and the color conversion layers may be attached after forming them on a second substrate.

The first and second electrodes 311 and 313 may be formed by using a material having transmittancy. In addition, the material for forming the first and second electrodes may be selected by taking account of its work function with the first and second electrodes. In this embodiment mode, the first electrode and the second electrode are assumed to be the anode and cathode respectively.

As materials for the anode electrode, it is preferable to use a metal having a large work function (4.0 eV or more), an alloy, an electrically conductive compound, or a mixture of them, or the like. Specifically, indium tin oxide (ITO), indium zinc oxide (IZO) in which 2 to 20% of zinc oxide (ZnO) is mixed with indium oxide, gold (Au), platinum (Pt), nickel (Ni), tungsten (W), chromium (Cr), molybdenum (Mo), iron (Fe), cobalt (Co), copper (Cu), palladium (Pd), nitride metal materials (TiN), and the like can be used.

As materials for the cathode electrode, it is preferable to use a metal having a small work function (3.8 eV or less), an alloy, an electrically conductive compound, or a mixture of them, or the like. For example, elements that belong to the first group or the second group of a periodic table, namely alkaline metals such as Li and Cs, and alkaline earth metals such as Mg, Ca and Sr, alloys including these elements (Mg: Ag, Al:Li), chemical compounds including these elements (LiF, CsF, $CaF_2$) and in addition, transition metals including rare earth metals can be used. However, since the anode and cathode electrodes are required to have transmittancy, it they are formed to be thin by using these metals or an alloy including these metals, and laminated with a metal such as ITO (including alloys). These anode and cathode may be formed by vapor deposition, sputtering, and the like.

According to the pixel structure described above, either the first electrode or the second electrode can be used as an anode or a cathode. For example, it is possible that the driving TFT 301 has an N-type polarity, the first electrode is the cathode, and the second electrode is the anode.

Then, a passivation film 314 including nitrogen is deposited by sputtering or CVD to block out moisture and oxygen. It is possible to fill nitrogen or place a drying agent in the space provided at this time. Furthermore, it is also possible to cover the side faces of the display panel with the first, second or other electrodes. Next, a sealing substrate 315 is attached thereto.

In addition, when performing a clearer black display, a polarizing plate or a circular polarizing plate is preferably provided. It is possible to dispose a polarizing plate or a circular polarizing plate on either side of the dual emission display panel for example since the image pickup device is required to have enough transmittancy to recognize a user. It is also possible to dispose a first polarizing plate or a second polarizing plate on each display screen of the dual emission display device. However, it is required in this case that the first polarizing plate and the second polarizing plate are disposed with their optical axes (absorption axes and transmission axes thereof) moved in some measure to come off crossed nicols so that the image pickup device has enough transmittancy to recognize a user while the dual emission display panel performs a black display.

As described above, the dual emission display panel according to the invention includes the first electrode 311 and the second electrode 313 each having transmittancy. The image pickup unit is disposed to be on the optical visual axis of the user. It may be disposed on the opposite side of the user with the dual emission display panel therebetween, and disposed on either side of the first display panel (display screen) or the second display panel (display screen) of the dual emission display panel. As a result, two parties can communicate while catching each other's eyes. In addition, it is possible to display an image on the dual emission display panel while imaging at the same time.

According to the pixel structure shown in FIG. 5, light is emitted to both sides (the first and second display screens) through the light-emitting layer. Therefore, it is possible to dispose the image pickup unit on the first display screen side of the dual emission display panel and the user on the second display screen side thereof, and vice versa, it is also possible to dispose the user on the first display screen side and the image pickup unit on the second display screen side. According to the present embodiment mode, when disposing the user on the second display screen side, a circuit for inverting a displayed image can be provided. In this case, the image pickup unit may be disposed so that eyes of two parties can meet each other, therefore, it is not necessarily disposed on the visual axis of the user through the dual emission display panel. For example, eyes of two parties can meet each other by disposing a reflector such as a mirror.

In addition, since light is emitted to both sides, a color and luminance of an image may deviate, which will prevent a fine and clear image of the user shot by the image pickup unit. In this case, data which is subtracted by image data displayed on the dual emission display panel may be input to the image pickup unit. Since the image data on the dual emission display panel is stored in a video memory, the correction may be performed so that the image data on the dual emission display panel is subtracted from the input memory of the image pickup unit. For example, the correction may be performed as described in Embodiment Mode 7.

By using the display device having a dual emission display panel which can take an image as described above, two parties can communicate while catching each other's eyes. In addition, by using such a display device which can take an image, a two-way communication system can be achieved.

Embodiment Mode 6

Figure 6A:
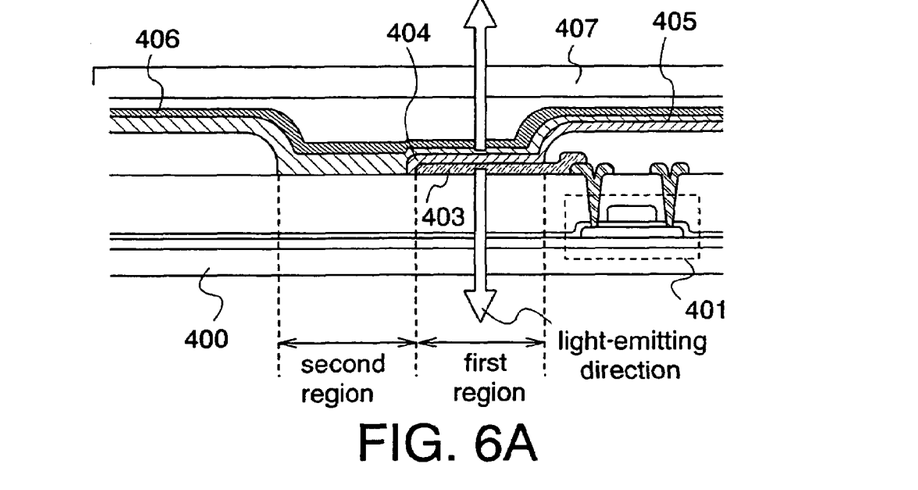
FIGS. 6A and 6B each illustrate a cross-sectional structure of a dual emission panel of the invention.
Figure 6B:
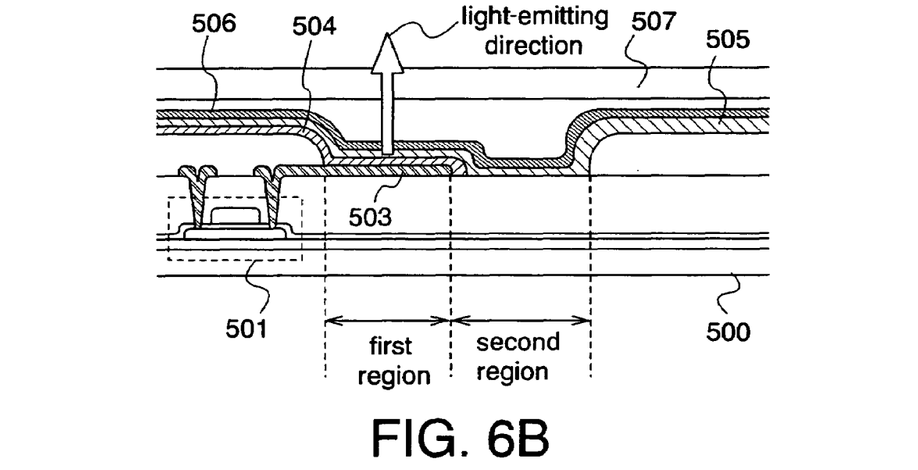
Figure 6C:
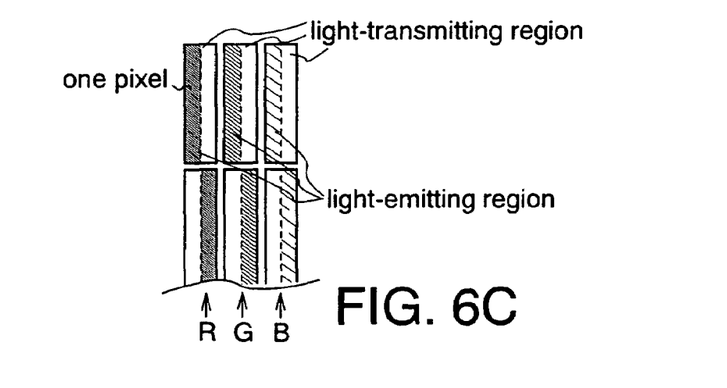
FIG. 6C illustrates pixels in a portable phone of the invention.

Described in this embodiment mode with reference to FIGS. 6A to 6C is another structure of a display panel which is different from Embodiment Mode 5.

FIG. 6A shows a pixel structure of a dual emission display panel in which one pixel, namely a hole of a second insulating film includes a first region including a light-emitting layer and a second region including no light-emitting layer.

A first electrode 403 having transmittancy in contact with an EL layer 404 including a light-emitting layer in the first region is electrically connected to a P-channel driving TFT 401 formed on an insulating surface 400. On the EL layer 404, a second electrode 405 having transmittancy is deposited. Current flows between the first electrode 403 and the second electrode 405, and light is emitted from the EL layer 404 in both directions as shown by arrows.

When light is emitted to both sides as described above, the first and second electrodes 403 and 405 are formed by using a light-transmissive conductive film such as ITO or a metal or an alloy including it as described in Embodiment Mode 5 so as to be thin enough to transmit light.

It is preferable to provide a passivation film 406 so as to protect the EL layer 404 from moisture or oxygen, and fill nitrogen or place a drying agent in the space provided at this time. Then, a sealing substrate 407 is attached to complete the pixel.

Each of the EL layer 404, the driving transistor TFT 401, the first electrode 403, and the second electrode 405 can be formed in the similar manner to Embodiment Mode 5. Although the first electrode 403 may be formed across the first and second regions as it has transmittancy, it is required to be formed at least on the first region. Meanwhile, the organic compound layer 404 is formed only on the first electrode 403 in the first region since it is a colored layer. For example, in the case of forming the EL layer 404 by vapor deposition, the size of an aperture of a metal mask is designed so that the EL layer 404 is formed only on the first electrode 403.

FIG. 6B shows a pixel structure in which a light is emitted to the topside only, which is different from the structure shown in FIG. 6A. An EL layer 504 including a light-emitting layer in the first region is connected to a first electrode 503 connected to a P-channel driving TFT 501. Since light is emitted to the upside only, the first electrode 503 is not required to have transmittancy, and it can be used as a source wiring or a drain wiring of the driving TFT 501 as well. In the case of using the first electrode 503 also as the source wiring or the drain wiring of the driving TFT 501, a laminate film may be preferably used, which includes a first metal layer including titanium, a second metal layer including titanium nitride or tungsten nitride, a third metal layer including alminium, and a fourth metal layer including titanium nitride.

The first electrode is not formed in the second region since it does not have transmittancy. The EL layer 504 including the light-emitting layer is not formed in the second region. Then, a second electrode 505 having transmittancy is formed thereon.

It is preferable to provide a passivation film 506 so as to protect the EL layer 504 from moisture or oxygen, and fill nitrogen or place a drying agent in the space provided at this time. Then, a sealing substrate 507 is attached to form the pixel.

Current flows between the first electrode 503 and the second electrode 505, and light is emitted from the organic compound layer 504. At this time, the first electrode 503 including the metal material reflects light while the second electrode 505 transmits light, therefore, light is emitted to the second electrode 505 side in the first region whereas no light is emitted in the second region.

Each of the first electrode 503, the EL layer 504, and the second electrode 505 can be formed in the similar manner to Embodiment Mode 5. However, as for the pixel structure shown in FIG. 6B, the second electrode 505 is required to have transmittancy. Therefore, the second electrode 505 is formed by using a light-transmissive material or metal, or an alloy including them in a small thickness, and stacking a light-transmissive material thereon. In addition, since light is emitted to the second electrode 505 side, the first electrode 503 may be formed to have a smaller transmittancy than that of the second electrode 505.

The description is heretofore made on the pixel structure shown in FIG. 6B, however, the first electrode 503 has a larger transmittancy than that of the second electrode 505 and the second electrode in not formed in the second region, the light emission direction can be inverted. In this case, the first electrode 503 can be formed in the second region.

According to the pixel structure shown in FIG. 6B, light emitted from the EL layer 504 does not come into the image pickup device, which hardly causes a deviation in color and luminance.

FIG. 6C shows an enlarged view of a pixel portion having the pixel structure of this embodiment mode. FIGS. 6A and 6B each show a pixel structure having a light-emitting region and a light-transmitting region. Although the light-emitting region and the light-transmitting region may be disposed with the same alignment in each pixel of red (R), green (G), and blue (B) they are preferably disposed alternately as shown in FIG. 6C.

As compared to Embodiment Mode 5, an image is displayed by using the first region in a pixel while outside light in transmitted through the second region, which may decrease a light-emitting area by half as shown in FIG. 6C. In view of the problem, a reflective film including a metal or a film including a colored resin may be provided in the opposite side to the light emission direction in the first region in FIG. 6B. In particular, the reflective film is preferably formed with concavity and convexity to utilize the emitted light efficiently.

Since an image pickup is performed by the image pickup means using the region in which no light is emitted and have larger transmittancy according to the present embodiment mode, the image pickup unit can recognize the user with higher accuracy.

Embodiment Mode 7

Figure 7A:
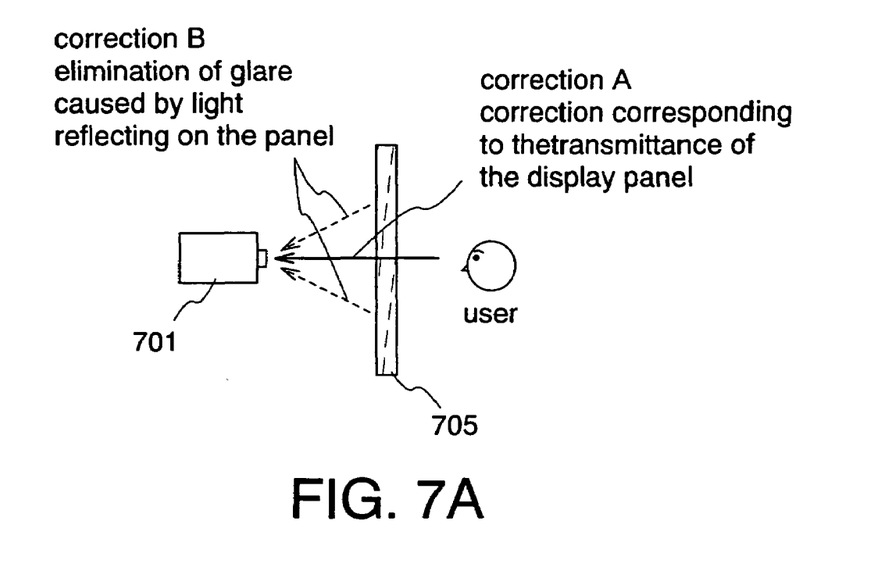
FIGS. 7A illustrates a videophone system of the invention, and 7B shows a flow chart for correction of the invention.
Figure 7B:
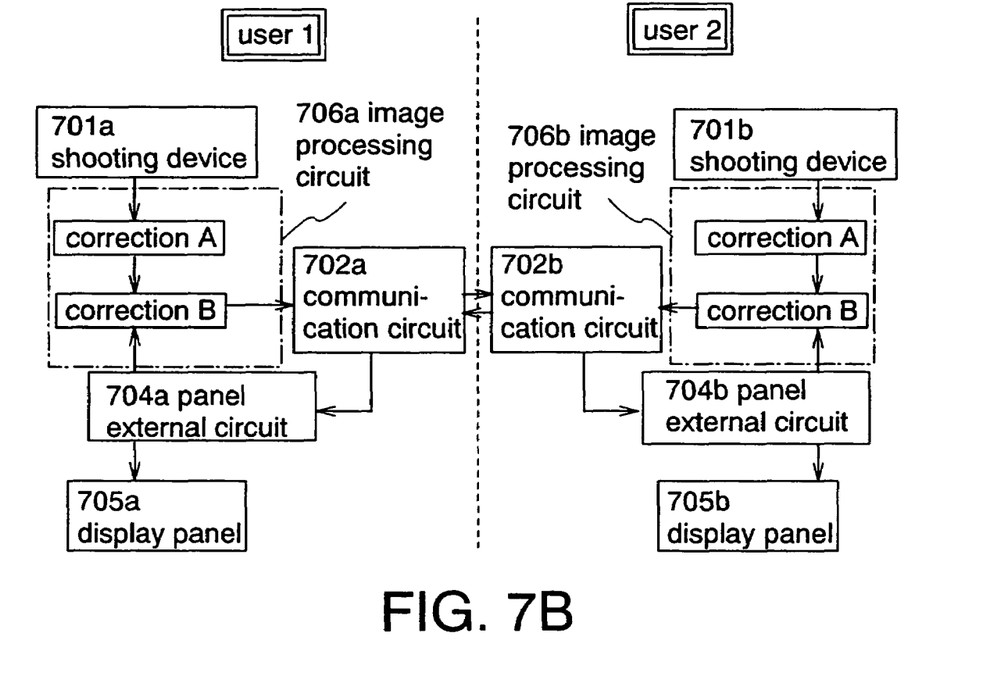

Described in this embodiment mode is a method for correcting an image that is shot by the image pickup unit described in Embodiment Modes 1 to 6 with reference to FIGS. 7A and 7B.

FIG. 7A shows an image pickup device 701, a display panel (dual emission display panel, for example) 705, a correction A in which a deviation in color and luminance of an image is corrected corresponding to the transmittance of the panel, and a correction B in which the glare caused by light reflecting on the panel is eliminated from an image.

FIG. 7B shows a flow chart showing a two-way communication system between two parties. Described below is the case where each of the two parties has the identical two-way communication device.

In two-way communication, two parties communicate with each other through image pickup device 701a and 701b, communication circuits 702a and 702b, image processing circuits 706a and 706b, panel external circuits 704a and 704b, panels 705a and 705b, and communication circuits 702a and 702b. Each of the image processing circuits 706a and 706b has a function to perform the correction A and a function to perform the correction B, and each of them is controlled by the panel external circuits 704a and 704b.

Each of the image pickup devices 701a and 701b take images of the two parties through the panels 705a and 705b. At this time, the correction A in which a deviation in color and luminance of an image is corrected corresponding to the transmittance of the panel is performed. Also, the correction B in which the glare caused by light reflecting on the panel is eliminated from an image is performed. As a result, corrected images of two parties are completed. Either the correction A or the correction B can precede or they may be performed at the same time. In addition, each of the correction A and the correction B can be performed by using the same correction circuit. The circuit for performing the correction A may be disposed either between the communication circuit 702a and 702b and the panel external circuit 704a and 704b or between the panel external circuit 704a and 704b and the display panel 705a and 705b. Further, in addition to the function to perform the correction B, a function for processing an image corresponding to a lens or focus may be performed, in which a filtering such as blurring and shrinking is applied to a component of the light emission.

Such corrected images are transmitted through the communication circuits 702a and 702b.

The images transmitted from the communication circuits 702a and 702b are input to the panel external circuits 704a and 704b respectively, and then displayed on the display panels 705a and 705b. Specifically, corrected images a and b are input to signal lines disposed in the display panels 705a and 705b.

By using the corrected images a and b as described above, communication can be performed with high accuracy.

The method for correcting the images in this embodiment can be freely combined with any one of Embodiment Modes 1 to 6.

Embodiment Mode 8

Described heretofore in accordance with the foregoing embodiment modes are the display panels including light emitting pixels. However, the invention is not limited to them and can be applied to any light-transmissive display panel. Therefore, a liquid crystal display panel having transmittancy can be used for example. As for the liquid crystal display panel having transmittancy, a light-transmissive liquid crystal display panel or a semi-transmissive display panel can be used.

In order to obtain higher transmittancy, a display panel is not provided a polarizing plate or is provided a polarizing plate and the like having an aperture. The aperture formed in the polarizing plate may be formed in a part of the pixels or in the whole pixels in a dot pattern. In the semi-transmissive liquid crystal panel, the aperture may be formed in the polarizing plate in adjustment with the aperture in the pixel electrode. For example, as for FIGS. 3A to 3D, a light-transmissive liquid crystal display panel including a polarizing plate having an aperture can be used as the dual emission display panel 100 while using a light-transmissive liquid crystal display panel without polarizing plate as the image pickup screen 121.

In addition, such a light-transmissive liquid crystal display panel can be combined with a dual emission display panel as well. For example, as for FIGS. 3A to 3D, the dual emission display panel 100 can be combined with a light-transmissive liquid crystal display panel including no polarizing plate and the like as the image pickup screen 121 to complete the portable phone.

According to the invention, a compact and lightweight display device having an image pickup function can be provided by mounting a dual emission display panel and an image pickup unit thereto without using a complicated optical system and an optical system having a long light path. That is, according to the structure of the invention, it is possible to take an image of a user as an object while displaying an image to be viewed by the user while he is facing the display screen. That is, an image display and an image pickup can be performed at the same time while securing an eye focus of the user who is viewing the displayed image. In particular, when each of a user and the other party uses the similar two-way communication devices, they can communicate while catching each other's eyes. Also, the invention provides a display device having an image pickup function and a two-way communication system which can display an image and image an image of a user as an object at the same time while securing an eye focus of the user who is viewing the displayed image.

What is claimed is:

1. A display device comprising:
    a display panel including a plurality of pixels having transmittancy; and
    an image pickup device disposed over one side of the display panel,
    wherein each of the plurality of pixels includes a light-emitting element and a thin film transistor,
    wherein the light-emitting element includes a first electrode, an EL layer, and a second electrode,
    wherein each of the plurality of pixels has a first region in which the first electrode, the EL layer and the second electrode are provided, and a second region in which the second electrode is provided and in which the first electrode is not provided, the second region being transmissive to visible light,
    wherein an interlayer film is provided between the thin film transistor and the light-emitting element, the interlayer film being in contact with the first electrode in the first region, and the interlayer film being in contact with the second electrode in the second region,
    wherein a bank is provided over the interlayer film,
    wherein a passivation film is provided over the second electrode, the passivation film being in contact with the second electrode, and
    wherein the image pickup device takes an image of an object by receiving visible light from the object through the second regions of the plurality of pixels included in the display panel.

2. The display device according to claim 1, wherein the light-emitting element generates electroluminescence.

3. The display device according to claim 1, wherein the display device performs:
    a first correction in which a deviation in color and luminance of the image is corrected corresponding to a transmittance of the display panel; and
    a second correction in which a glare caused by a light reflecting on the display panel is eliminated from the image.

4. A display device comprising:
    a display panel including light-emitting elements formed over a light-transmissive substrate; and
    an image pickup device disposed over one side of the display panel,
    wherein the display panel includes a plurality of pixels formed over the light-transmissive substrate,
    wherein each of the plurality of pixels includes one of the light-emitting elements and a thin film transistor,
    wherein each of the light-emitting elements includes a first electrode, an EL layer, and a second electrode,
    wherein each of the plurality of pixels has a first region in which the first electrode, the EL layer and the second electrode are provided, and a second region in which the second electrode is provided and in which the first electrode is not provided, the second region being transmissive to visible light,
    wherein an interlayer film is provided between the thin film transistor and the light-emitting elements, the interlayer film being in contact with the first electrode in the first region, and the interlayer film being in contact with the second electrode in the second region,
    wherein a bank is provided over the interlayer film, and
    wherein a passivation film is provided over the second electrode, the passivation film being in contact with the second electrode.

5. The display device according to claim 4, wherein the light-emitting elements generate electroluminescence.

6. The display device according to claim 4, wherein the image pickup device takes an image of an object by receiving visible light from the object through the second regions of the plurality of pixels included in the display panel, and wherein the display device performs:
    a first correction in which a deviation in color and luminance of the image is corrected corresponding to a transmittance of the display panel; and
    a second correction in which a glare caused by a light reflecting on the display panel is eliminated from the image.

7. A display device comprising:
a display panel including light-emitting elements which transmit visible light and emit light to at least one side of the display panel, with the light-emitting elements being formed over a light-transmissive substrate; and
an image pickup device disposed over the other side of the display panel,
wherein the display panel includes a plurality of pixels formed over the light-transmissive substrate,
wherein each of the plurality of pixels includes one of the light-emitting elements and a thin film transistor,
wherein each of the light-emitting elements includes a first electrode, an EL layer, and a second electrode,
wherein each of the plurality of pixels has a first region in which the first electrode, the EL layer and the second electrode are provided, and a second region in which the second electrode is provided and in which the first electrode is not provided, the second region being transmissive to visible light,
wherein an interlayer film is provided between the thin film transistor and the light-emitting elements, the interlayer film being in contact with the first electrode in the first region, and the interlayer film being in contact with the second electrode in the second region,
wherein a bank is provided over the interlayer film, and
wherein a passivation film is provided over the second electrode, the passivation film being in contact with the second electrode.

8. The display device according to claim 7, wherein the light-emitting elements generate electroluminescence.

9. The display device according to claim 7, wherein the image pickup device takes an image of an object by receiving visible light from the object through the second regions of the plurality of pixels included in the display panel, and wherein the display device performs:
a first correction in which a deviation in color and luminance of the image is corrected corresponding to a transmittance of the display panel; and
a second correction in which a glare caused by a light reflecting on the display panel is eliminated from the image.

10. A two-way communication system comprising:
a display panel including a plurality of pixels having transmittancy; and
an image pickup device disposed over one side of the display panel,
wherein each of the plurality of pixels includes a light-emitting element and a thin film transistor,
wherein the light-emitting element includes a first electrode, an EL layer, and a second electrode,
wherein each of the plurality of pixels has a first region in which the first electrode, the EL layer and the second electrode are provided, and a second region in which the second electrode is provided and in which the first electrode is not provided, the second region being transmissive to visible light,
wherein an interlayer film is provided between the thin film transistor and the light-emitting element, the interlayer film being in contact with the first electrode in the first region, and the interlayer film being in contact with the second electrode in the second region,
wherein a bank is provided over the interlayer film,
wherein a passivation film is provided over the second electrode, the passivation film being in contact with the second electrode, and
wherein the image pickup device takes a first image of a first user by receiving visible light from the first user through the second regions of the plurality of pixels included in the display panel while a second image of a second user is displayed on the display panel at the same time.

11. The two-way communication system according to claim 10, wherein the light-emitting element generates electroluminescence.

12. The two-way communication system according to claim 10, wherein the two-way communication system performs:
a first correction in which a deviation in color and luminance of each of the first image and the second image is corrected corresponding to a transmittance of the display panel; and
a second correction in which a glare caused by a light reflecting on the display panel is eliminated from each of the first image and the second image.

13. A two-way communication system comprising:
a display panel including light-emitting elements formed over a light-transmissive substrate; and
an image pickup device disposed over one side of the display panel,
wherein the display panel includes a plurality of pixels formed over the light-transmissive substrate,
wherein each of the plurality of pixels includes a thin film transistor and one of the light-emitting elements,
wherein each of the light-emitting elements includes a first electrode, an EL layer, and a second electrode,
wherein each of the plurality of pixels has a first region in which the first electrode, the EL layer and the second electrode are provided, and a second region in which the second electrode is provided and in which the first electrode is not provided, the second region being transmissive to visible light,
wherein an interlayer film is provided between the thin film transistor and the light-emitting elements, the interlayer film being in contact with the first electrode in the first region, and the interlayer film being in contact with the second electrode in the second region,
wherein a bank is provided over the interlayer film,
wherein a passivation film is provided over the second electrode, the passivation film being in contact with the second electrode, and
wherein the image pickup device takes a first image of a first user by receiving visible light from the first user through the second regions of the plurality of pixels included in the display panel while a second image of a second user is displayed on the display panel at the same time.

14. The two-way communication system according to claim 13, wherein the light-emitting elements generate electroluminescence.

15. The two-way communication system according to claim 13, wherein the two-way communication system performs:
a first correction in which a deviation in color and luminance of each of the first image and the second image is corrected corresponding to a transmittance of the display panel; and
a second correction in which a glare caused by a light reflecting on the display panel is eliminated from each of the first image and the second image.

16. A two-way communication system comprising:
a display panel including light-emitting elements which transmit visible light and emit light to at least one side of the display panel, with the light-emitting elements being formed over a light-transmissive substrate; and an image pickup device disposed over the other side of the display panel, wherein the display panel includes a plurality of pixels formed over the light-transmissive substrate, wherein each of the plurality of pixels includes one of the light-emitting elements and a thin film transistor, wherein each of the light-emitting elements includes a first electrode, an EL layer, and a second electrode, wherein each of the plurality of pixels has a first region in which the first electrode, the EL layer and the second electrode are provided, and a second region in which the second electrode is provided and in which the first electrode is not provided, the second region being transmissive to visible light, wherein an interlayer film is provided between the thin film transistor and the light-emitting elements, the interlayer film being in contact with the first electrode in the first region, and the interlayer film being in contact with the second electrode in the second region, wherein a bank is provided over the interlayer film, wherein a passivation film is provided over the second electrode, the passivation film being in contact with the second electrode, and wherein the image pickup device takes a first image of a first user by receiving visible light from the first user through the second regions of the plurality of pixels included in the display panel while a second image of a second user is displayed on the display panel at the same time.

17. The two-way communication system according to claim 16, wherein the light-emitting elements generate electroluminescence.

18. The two-way communication system according to claim 16, wherein the two-way communication system performs:

a first correction in which a deviation in color and luminance of each of the first image and the second image is corrected corresponding to a transmittance of the display panel; and a second correction in which a glare caused by a light reflecting on the display panel is eliminated from each of the first image and the second image.

* * * * *